United States Patent
Matsukawa

(10) Patent No.: US 10,764,768 B2
(45) Date of Patent: Sep. 1, 2020

(54) COMMUNICATION APPARATUS THAT FLEXIBLY RESPONDS TO A CHANGE IN A NETWORK CONFIGURATION, NETWORK SYSTEM THEREWITH, AND NON-TRANSITORY COMPUTER READABLE MEDIUM THEREFOR

(71) Applicant: FUJI XEROX CO., LTD., Tokyo (JP)

(72) Inventor: Kenji Matsukawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 23 days.

(21) Appl. No.: 16/167,545

(22) Filed: Oct. 23, 2018

(65) Prior Publication Data

US 2019/0313261 A1   Oct. 10, 2019

(30) Foreign Application Priority Data

Apr. 9, 2018  (JP) ................. 2018-075027

(51) Int. Cl.
| | |
|---|---|
| H04L 12/28 | (2006.01) |
| H04W 24/02 | (2009.01) |
| H04W 28/06 | (2009.01) |
| H04W 8/00 | (2009.01) |
| H04L 12/741 | (2013.01) |
| H04W 88/04 | (2009.01) |
| H04J 1/16 | (2006.01) |
| H04W 84/12 | (2009.01) |
| H04W 84/18 | (2009.01) |

(52) U.S. Cl.
CPC ............ *H04W 24/02* (2013.01); *H04L 45/74* (2013.01); *H04W 8/005* (2013.01); *H04W 28/06* (2013.01); *H04W 88/04* (2013.01); *H04W 84/12* (2013.01); *H04W 84/18* (2013.01)

(58) Field of Classification Search
CPC ........ H04L 45/18; H04W 40/24; H04W 88/04
USPC ................... 370/252, 254, 329, 386
See application file for complete search history.

(56) References Cited

U.S. PATENT DOCUMENTS

| | | | |
|---|---|---|---|
| 8,155,008 B2 | 4/2012 | Jetcheva et al. | |
| 8,948,015 B2 | 2/2015 | Jetcheva et al. | |
| 2010/0046524 A1* | 2/2010 | Rune | H04L 12/4633 370/395.53 |
| 2012/0008491 A1* | 1/2012 | Shimada | H04L 12/4641 370/218 |
| 2013/0301553 A1* | 11/2013 | Klein | H04W 84/12 370/329 |
| 2015/0381489 A1 | 12/2015 | Jetcheva et al. | |
| 2018/0252991 A1* | 9/2018 | Tomita | G06F 13/38 |

FOREIGN PATENT DOCUMENTS

| | | |
|---|---|---|
| JP | H10145426 | 5/1998 |
| JP | 2012110012 | 6/2012 |

* cited by examiner

*Primary Examiner* — John Pezzlo
(74) *Attorney, Agent, or Firm* — JCIPRNET

(57) ABSTRACT

A communication apparatus includes a transmitting and receiving unit that is connected to a network and that transmits and receives data, a relaying unit that, when data is received through a communication that is not addressed to the communication apparatus, relays the communication, and a discarding unit that, when data is received through the same communication as a communication that has been relayed previously, discards the data.

12 Claims, 7 Drawing Sheets

US 10,764,768 B2

COMMUNICATION APPARATUS THAT FLEXIBLY RESPONDS TO A CHANGE IN A NETWORK CONFIGURATION, NETWORK SYSTEM THEREWITH, AND NON-TRANSITORY COMPUTER READABLE MEDIUM THEREFOR

CROSS-REFERENCE TO RELATED APPLICATIONS

This application is based on and claims priority under 35 USC 119 from Japanese Patent Application No. 2018-075027 filed Apr. 9, 2018.

BACKGROUND

(i) Technical Field

The present disclosure relates to a communication apparatus, a network system, and a non-transitory computer readable medium.

(ii) Related Art

Optimizing a communication path on a network is desired to suppress a decrease in communication efficiency. In a technique of the related-art disclosed in Japanese Unexamined Patent Application Publication No. 2012-110012, a mesh network is broken up into a plurality of small meshes (groups), and efficiency improvement is attempted by learning communication paths. In this technique, inter-bridge control protocols operate by using pre-existing control packets. Pre-existing broadcast packet floods are used to learn the best paths across interconnected meshes. Enhanced routing protocols operating within each mesh may optionally examine information limited to the respective mesh when forwarding traffic, thus enabling robust multi-mesh scaling with respect to memory and processing time required by the routing protocols.

SUMMARY

The processing cost of grouping nodes and optimizing communication paths on a network is enormous, and thus performing such processing for a large-scale network is not easy. Further, when a network configuration is changed, optimization needs to be repeated, and handling such a task requires a huge amount of work.

Aspects of a non-limiting embodiment of the present disclosure relate to providing a communication apparatus, a network system, and a non-transitory computer readable medium that require no processing to optimize communication paths by learning or the like and that flexibly respond to a change in a network configuration to achieve improved communication efficiency.

Aspects of a certain non-limiting embodiment of the present disclosure overcome the above disadvantages and/or other disadvantages not described above. However, aspects of the non-limiting embodiment are not required to overcome the disadvantages described above, and aspects of the non-limiting embodiment of the present disclosure may not overcome any of the disadvantages described above.

According to an aspect of the present disclosure, there is provided a communication apparatus including a transmitting and receiving unit that is connected to a network and that transmits and receives data, a relaying unit that, when data is received through a communication that is not addressed to the communication apparatus, relays the communication, and a discarding unit that, when data is received through the same communication as a communication that has been relayed previously, discards the data.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the attached drawings.

System Configuration

Figure 1:
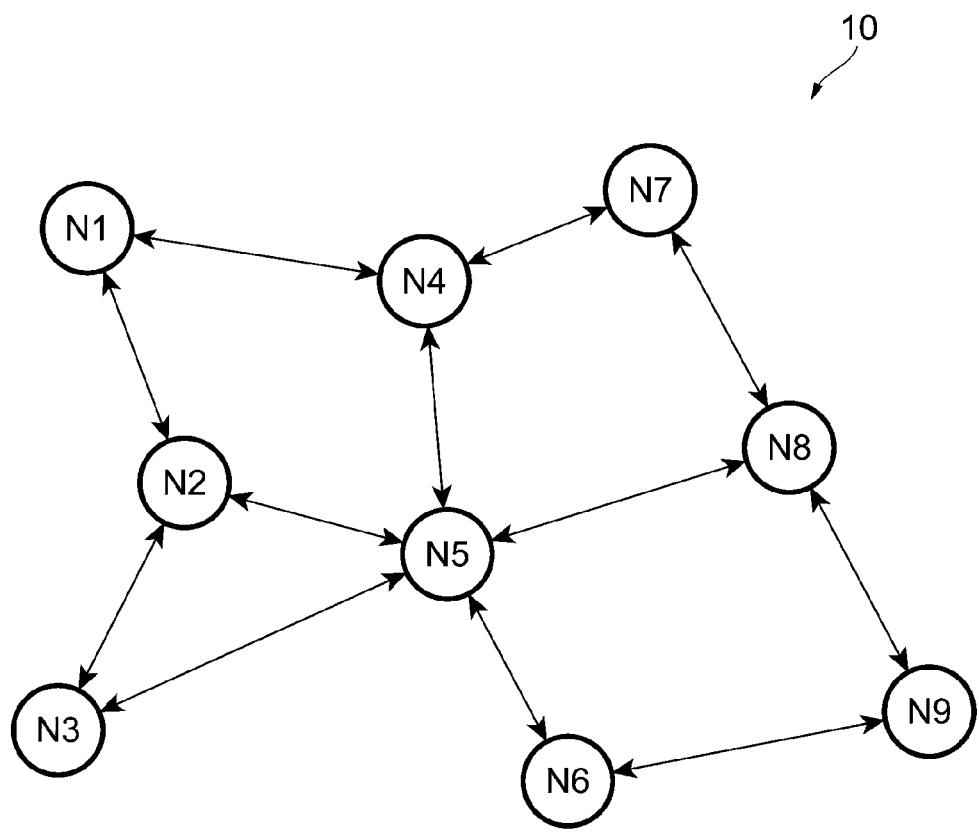
FIG. 1 depicts an overall configuration of a network system according to an exemplary embodiment.

FIG. 1 depicts an overall configuration of a network system according to the present exemplary embodiment. A network 10 to which the present exemplary embodiment is applied is assumed to be a mesh network. A mesh network is a communication network having a mesh-like network topology. On a mesh network, terminals having a communication function (nodes N1 to N9 in FIG. 1) communicate with each other and constitute a network like a net (mesh). A mesh network is typically applied to a wireless network but may also be applied to a wired network. As described above, terminals, which are nodes, mutually transmit and receive data on a mesh network. Thus, a central base station, an access point for wireless communication, or the like is not necessary on a mesh network.

On a mesh network, data is repeatedly and successively forwarded to an adjacent terminal and then to another terminal next to the adjacent terminal to finally reach a destination terminal, as in so-called bucket-brigade style transmission. No central equipment is necessary for a mesh network. Thus, if one or more terminals on a transmission path are damaged or inoperative, it is easy to secure an alternative path via other terminals, leading to greater resilience to failures than a star network or the like, which is controlled by central equipment. For example, it is assumed that communication is performed between node N1 and node N8 on a path N1-N4-N5-N8 on the network 10 depicted in FIG. 1. Even if node N5 fails or is removed from the mesh network, securing a path N1-N4-N7-N8, for example, enables the communication between node N1 and node N8 to continue.

On the network 10 depicted in FIG. 1, at least one of nodes N1 to N9 has a data transmitting function. The data transmitting function is a function to initiate transmission of data. Each of nodes N1 to N9 has a receiving function, a relaying function, a relay information retaining function, and a discarding function. The receiving function of a node is a function to receive data transmitted by any other node to the node. The relaying function of a node is a function to transmit, to another node, incoming data that is received from any other node and that is not addressed to the node.

The relay information retaining function of a node is a function to extract and retain, upon relaying incoming data, information to identify a node (source, node) that has initiated transmission of the data (hereinafter, referred to as a source node identifier) and information to uniquely identify a communication through which the data is transmitted (hereinafter, referred to as a communication identifier). The information to uniquely identify a communication is information to distinguish from other communications the communication through which data is transmitted from a source node and received by a destination node. The information to uniquely identify a communication is, for example, information attached to the communication by the source node.

The discarding function of a node is a function to discard data when the data is received through the same communication as the communication through which the node has transmitted data. The communication through which the node has transmitted data includes both transmission through the data transmitting function (transmission initiated by a source node) and transmission of incoming data to another node through the relaying function. The node determines whether data transmitted by the node and the incoming data relate to the same communication in accordance with whether the relay information retaining function retains the same information as a set of a source node identifier and a communication identifier that is extracted from the incoming data.

Functional Configuration of Terminal

Figure 2:
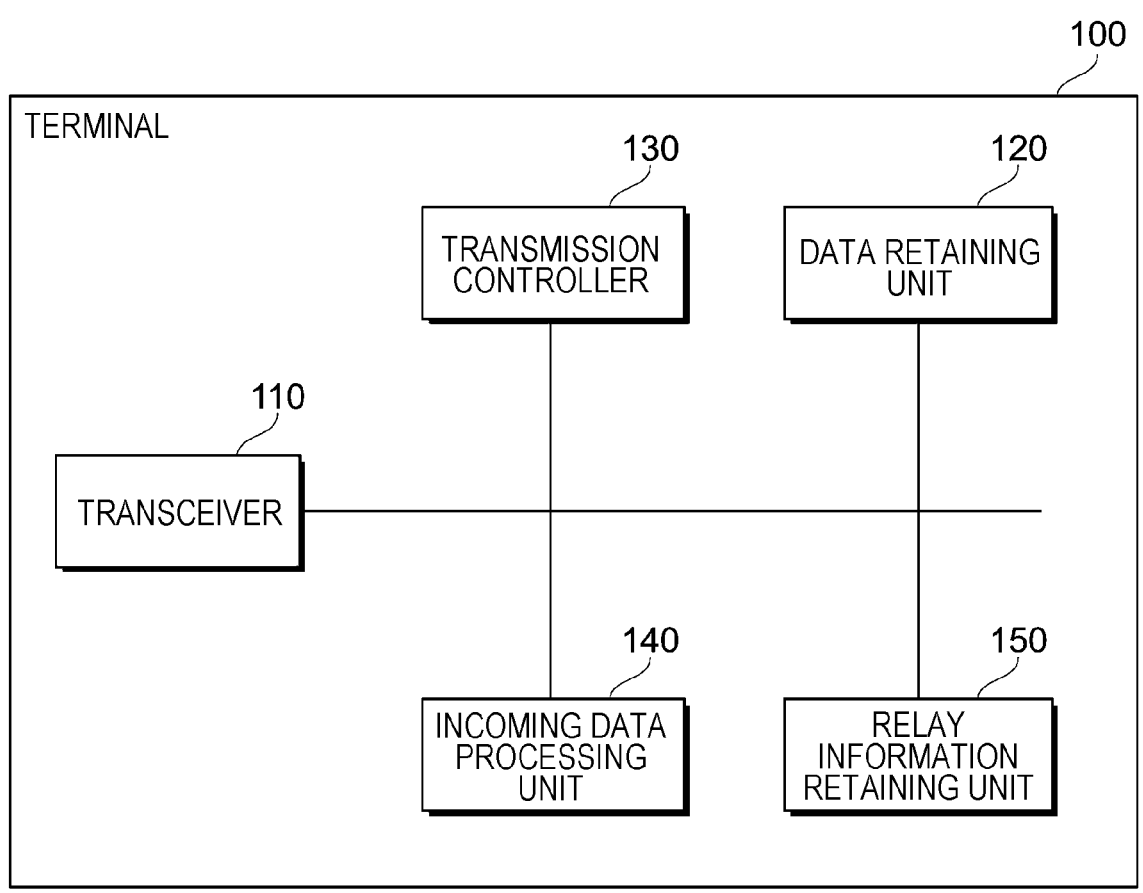
FIG. 2 depicts a functional configuration of a terminal constituting a node on a network.

FIG. 2 depicts a functional configuration of a terminal constituting a node on a network. A terminal 100, which constitutes a node on the network 10, transmits and receives data to and from other terminals 100 wirelessly. The terminal 100 includes a transceiver 110, a data retaining unit 120, a transmission controller 130, an incoming data processing unit 140, and a relay information retaining unit 150. FIG. 2 depicts a functional configuration used for data communication according to the present exemplary embodiment. In addition to the functions mentioned above, the terminal 100 includes a data acquiring unit, a data processing unit, various mechanisms, and the like, which are not depicted, in accordance with specific functions of each terminal 100.

The transceiver 110 is a communication unit that is connected to the network 10 to transmit and receive data. The transceiver 110 is an example of a transmitting and receiving unit. The transceiver 110 is, for example, a network interface to communicate wirelessly on the network 10. Data is transmitted by broadcasting from the transceiver 110. Specifically, data transmitted by the transceiver 110 is sent to all the terminals 100 other than the node that has transmitted the data that are present in the wirelessly reachable area.

The data retaining unit 120 is a unit to retain data transmitted and received via the network 10. The data retaining unit 120 is realized by using, for example, a random access memory (RAM) or a non-volatile memory. The data retaining unit 120 retains incoming data when the incoming data addressed to the node including the data retaining unit 120 is received. In addition, if the terminal 100 has the data transmitting function as a source node, the data retaining unit 120 retains data to be transmitted. The data to be transmitted is determined individually and specifically in accordance with the type and the functions of the terminal 100. For example, the data to be transmitted may be sensor data or the like obtained by various kinds of sensors or data generated by predetermined data processing. Further, the data to be transmitted may be data stored in advance in the non-volatile memory or the like and prepared for transmission.

The transmission controller 130 is a controlling unit to transmit data via the transceiver 110. When the terminal 100 receives incoming data that is not addressed to the terminal 100, the transmission controller 130 forwards the incoming data. If the terminal 100 has the data transmitting function as a source node, the transmission controller 130 transmits data that is retained in the data retaining unit 120 and that is to be transmitted. When transmitting, as a source node, data to be transmitted, the transmission controller 130 generates a source node identifier and a communication identifier and attaches these identifiers to an outgoing packet. For example, a Media Access Control (MAC) address or a serial number, which is product information specific to the terminal 100, may be used as a source node identifier. Further, for example, a time stamp of the transmission date and time may be used as a communication identifier. A source node identifier and a communication identifier attached to an outgoing packet are stored and retained in the relay information retaining unit 150.

The incoming data processing unit 140 is a processing unit to process incoming data received via the transceiver 110. First, the incoming data processing unit 140 determines whether the incoming data has been received through a communication addressed to the node that includes the incoming data processing unit 140. If the incoming data is data received through the communication addressed to the node that includes the incoming data processing unit 140, the incoming data processing unit 140 passes the incoming data to a data processing function provided by the node (the terminal 100) that includes the incoming data processing unit 140 and causes the incoming data to be processed. The data processing function provided by the terminal 100 is determined individually and specifically in accordance with the type and the functions of the terminal 100. Examples of such functions include a function to process incoming data and to transmit the incoming data to a higher-level managing server and a function to report data reception to a user of the terminal 100. The incoming data may also be stored and retained in the data retaining unit 120.

If the incoming data is not data received through a communication addressed to the node that includes the incoming data processing unit 140, the incoming data processing unit 140 extracts a source node identifier and a communication identifier from the incoming data packet. Then, the incoming data processing unit 140 examines whether the same information set as the extracted information set of the source node identifier and the communication identifier is already retained in the relay information retaining unit 150. If the same information set as the extracted information set of the source node identifier and the communication identifier is not retained in the relay information retaining unit 150, the incoming data from which this information set has been extracted is data that has not been received previously by the node that includes the incoming data processing unit 140. Then, the incoming data processing unit 140 stores the extracted information set in the relay information retaining unit 150 and provides the incoming data to the transmission controller 130, which forwards the incoming data.

In contrast, if the same information set as the extracted information set of the source node identifier and the communication identifier is retained in the relay information retaining unit 150, the incoming data from which this information set has been extracted is data that has been received at least once previously and that has been transmitted previously by the node that includes the incoming data processing unit 140. Accordingly, the incoming data processing unit 140 discards the incoming data without forwarding the incoming data. The data that has been transmitted previously by the node includes incoming data that is not addressed to the node and that has been forwarded previously by the node and data that has been transmitted by the node as the source node. Thus, if the node receives, from another node, incoming data that has been transmitted by the node as the source node, such incoming data is discarded.

As described above, the incoming data processing unit 140 of the terminal 100 is an example of an extracting unit and a discarding unit. Further, the transmission controller 130 and the incoming data processing unit 140 of the terminal 100 are examples of a relaying unit.

The relay information retaining unit 150 is a unit to retain a set of a source node identifier and a communication identifier generated by the transmission controller 130 and a set of a source node identifier and a communication identifier extracted from an incoming data packet by the incoming data processing unit 140. The relay information retaining unit 150 is realized, for example, by using a RAM or a non-volatile memory. The relay information retaining unit 150 is an example of a retaining unit.

Figure 3:
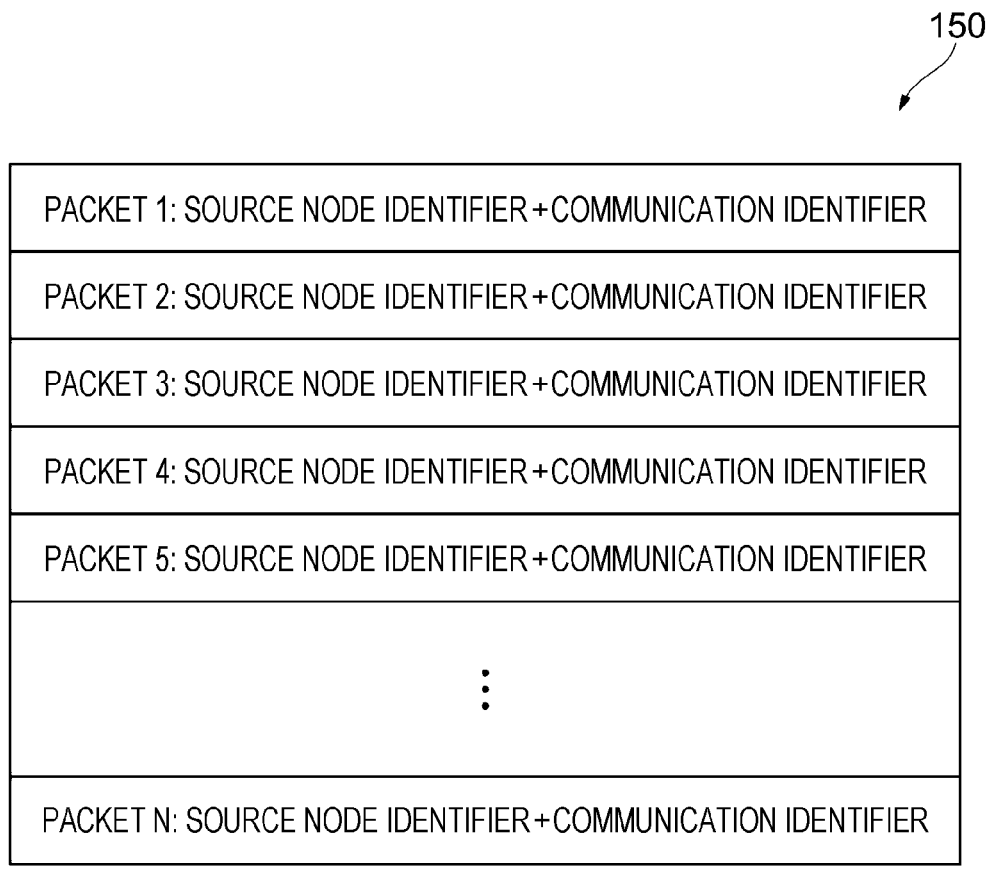
FIG. 3 depicts an example configuration of a relay information retaining unit.

FIG. 3 depicts an example configuration of the relay information retaining unit 150. Each time the terminal 100 receives a packet, a set of a source node identifier and a communication identifier extracted from the packet is stored in the relay information retaining unit 150. After information is accumulated to the upper limit of the memory capacity of the relay information retaining unit 150, old information is successively deleted, and information extracted from a newly received incoming packet is retained. In the example depicted in FIG. 3, once information corresponding to N packets is accumulated, a piece of old information is successively deleted when a newly obtained piece of information is stored.

Terminal Operation at Time of Initiating Data Transmission

Figure 4:
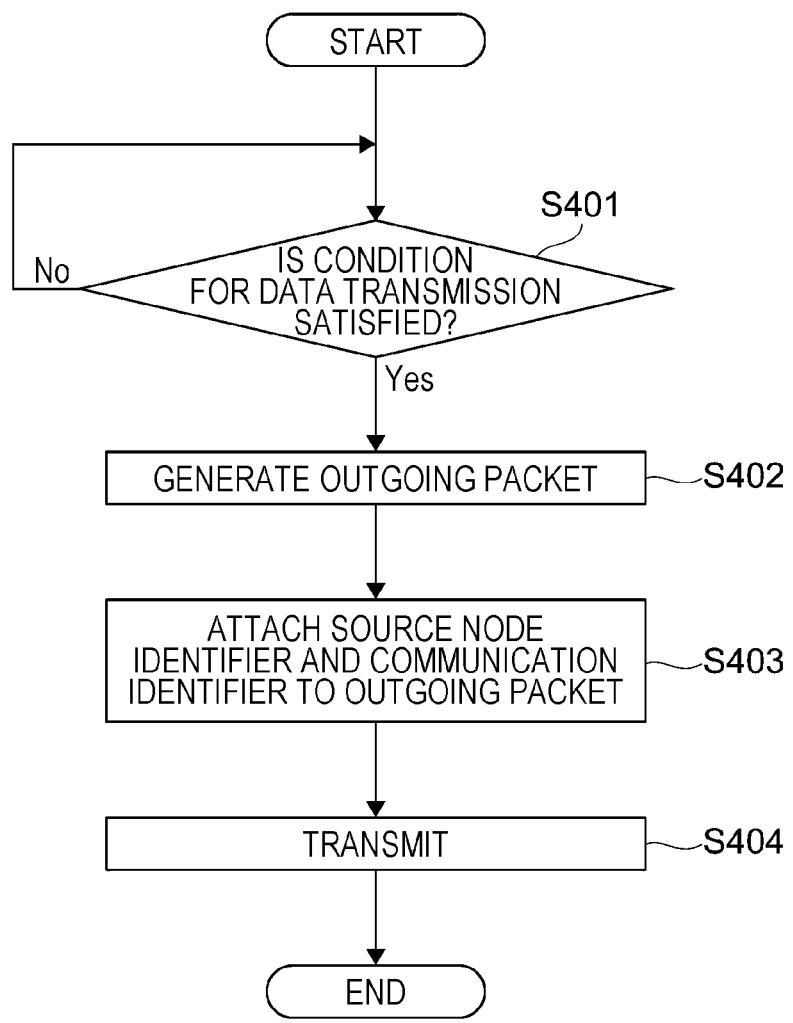
FIG. 4 is a flowchart illustrating operation of the terminal at the time of initiating data transmission.

FIG. 4 is a flowchart illustrating operation of the terminal 100 at the time of initiating data transmission. The terminal 100, which functions as a source node, generates an outgoing packet including data to be transmitted when a condition for data transmission is satisfied (steps S401 and S402). Next, the transmission controller 130 generates a source node identifier to identify the node functioning as the source node and a communication identifier to identify the communication and attaches these identifiers to the outgoing packet (step S403). The source node identifier and the communication identifier that are generated are retained in the relay information retaining unit 150. Then, the transmission controller 130 controls the transceiver 110 to transmit the outgoing packet to the network 10 as a broadcast packet (step S404).

Terminal Operation at Time of Receiving Data

Figure 5:
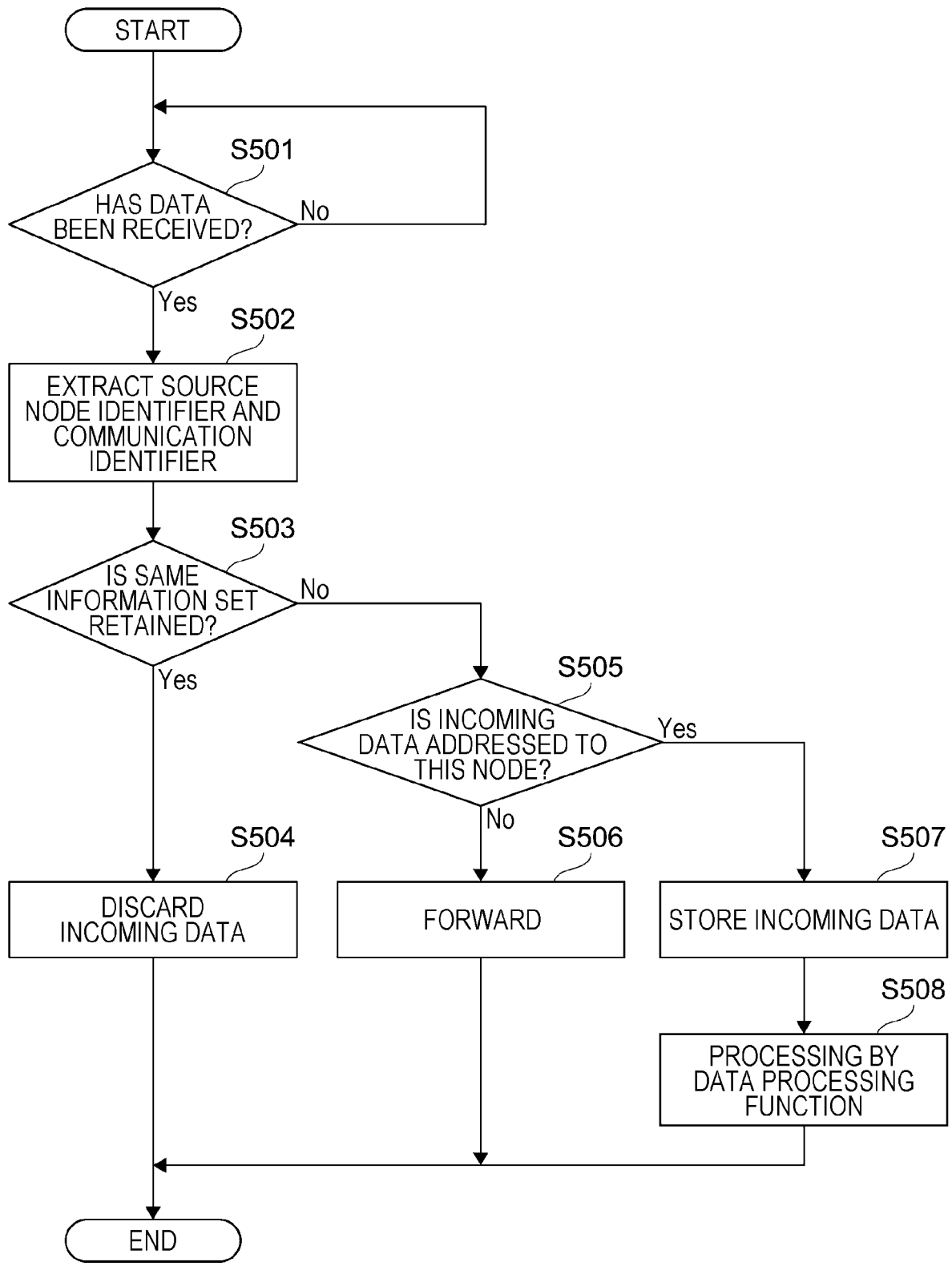
FIG. 5 is a flowchart illustrating operation of the terminal at the time of receiving data.

FIG. 5 is a flowchart illustrating operation of the terminal 100 at the time of receiving data. When the transceiver 110 of the terminal 100 receives data, the terminal 100 proceeds to processing performed by the incoming data processing unit 140 (step S501). The incoming data processing unit 140 first extracts a source node identifier and a communication identifier from an incoming data packet (step S502). Then, the incoming data processing unit 140 examines whether the same information set as the extracted information set of the source node identifier and the communication identifier is retained in the relay information retaining unit 150 (step S503). If the same information set is retained (Yes in step S503), the incoming data processing unit 140 discards the incoming data (step S504).

If the same information set is not retained (No in step S503), the incoming data processing unit 140 next determines whether the incoming data has been received through the communication addressed to the node that includes the incoming data processing unit 140 (step S505). If the incoming data has not been received through the communication addressed to the node that includes the incoming data processing unit 140 (No in step S505), the incoming data processing unit 140 causes the relay information retaining unit 150 to retain the information set extracted in step S502 and causes the transmission controller 130 to forward the incoming data (step S506). The transmission controller 130 controls the transceiver 110 to transmit the incoming data packet as a broadcast packet.

In contrast, if the incoming data has been received through the communication addressed to the node that includes the incoming data processing unit 140 (Yes in step S505), the incoming data processing unit 140 stores the incoming data in the data retaining unit 120 (step S507). Then, the terminal 100 proceeds to processing by individual data processing functions (step S508).

Data Forwarding Example

Figure 6:
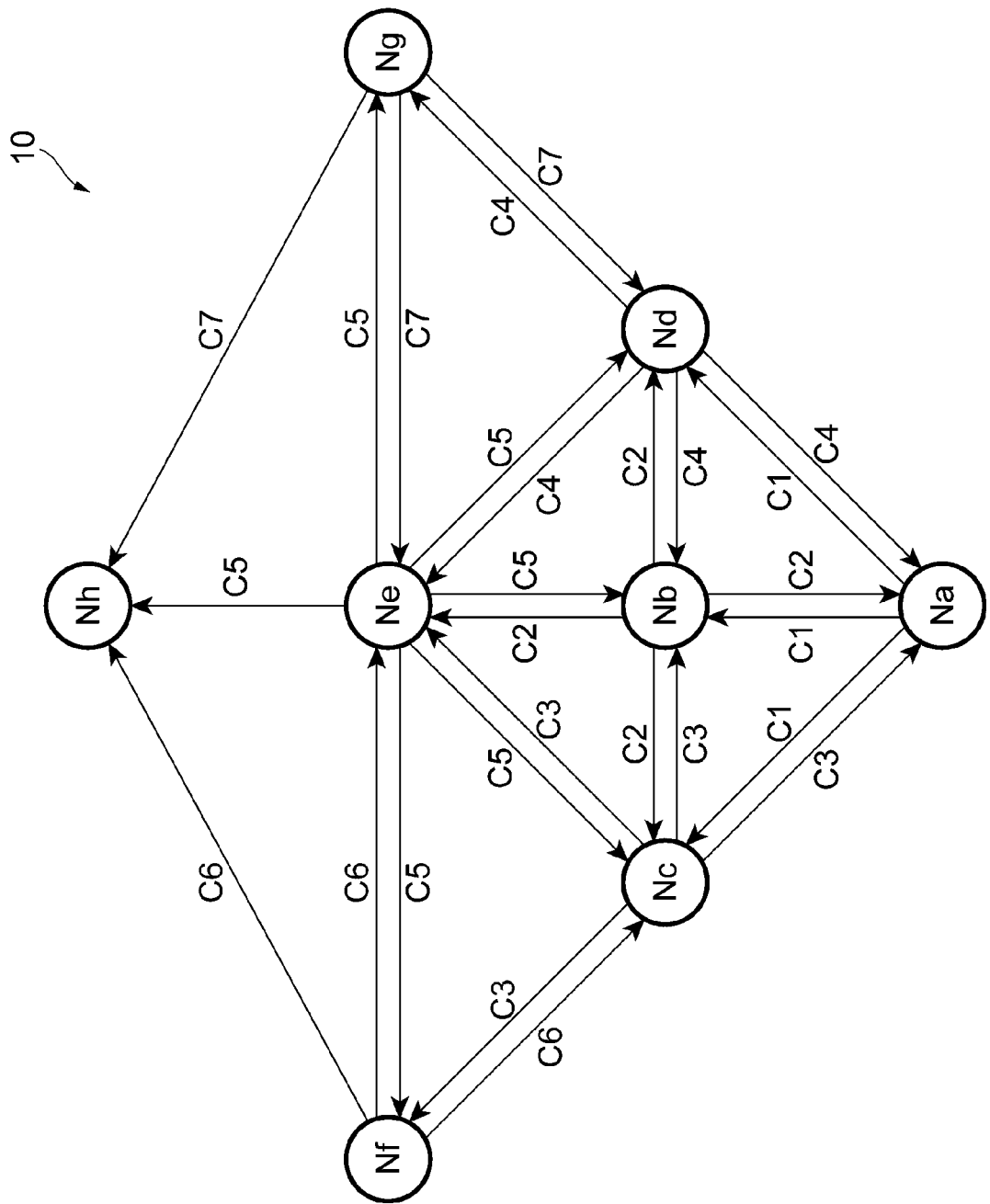
FIG. 6 depicts data forwarding from a source node to a destination node.

FIG. 6 depicts a way of forwarding data from a source node to a destination node. The network 10 depicted in FIG. 6 includes 8 nodes, which are node Na to node Nh. It is assumed that data is forwarded from node Na, which is the source node, to node Nh on the network 10. On the network 10 depicted in FIG. 6, node Na is able to communicate directly with nodes Nb, Nc, and Nd. Node Nb is able to communicate directly with nodes Na, Nc, Nd, and Ne. Node Nc is able to communicate directly with nodes Na, Nb, Ne, and Nf. Node Nd is able to communicate directly with nodes Na, Nb, Ne, and Ng. Node Ne is able to communicate directly with nodes Nb, Nc, Nd, Nf, Ng, and Nh. Node Nf is able to communicate directly with nodes Nc, Ne, and Nh. Node Ng is able to communicate directly with nodes Nd, Ne, and Nh. Node Nh is able to communicate directly with nodes Ne, Nf, and Ng.

In FIG. 6, node Na, which is the source node, transmits a piece of data to nodes Nb, Nc, and Nd (arrows C1). Node Nb forwards the piece of data received from node Na to nodes Na, Nc, Nd, and Ne because the piece of data is not addressed to node Nb (arrows C2). Similarly, node Nc forwards the piece of data received from node Na to nodes Na, Nb, Ne, and Nf because the piece of data is not addressed to node Nc (arrows C3). Similarly, node Nd forwards the piece of data received from node Na to nodes Na, Nb, Ne, and Ng because the piece of data is not addressed to node Nd (arrows C4).

Then, node Na receives pieces of data forwarded by nodes Nb, Nc, and Nd described above (arrows C2, C3, and C4). Node Na discards the pieces of incoming data because the pieces of incoming data are not addressed to node Na and are the same as the piece of data transmitted by node Na.

In addition, node Nb further receives pieces of data forwarded by nodes Nc and Nd (arrows C3 and C4). Node Nb discards the pieces of incoming data because the pieces of incoming data are not addressed to node Nb and are the same as the piece of data that has been received from node Na previously.

Similarly, node Nc further receives a piece of data forwarded by node Nb (arrow C2). Node Nc discards the piece of incoming data because the piece of incoming data is not addressed to node Nc and is the same as the piece of data that has been received from node Na previously.

Similarly, node Nd further receives a piece of data forwarded by node Nb (arrow C2). Node Nd discards the piece of incoming data because the piece of incoming data is not addressed to node Nd and is the same as the piece of data that has been received from node Na previously.

Next, node Ne receives a piece of data relating to this communication for the first time, and the piece of data has been forwarded by node Nb (arrow C2). Node Ne forwards the piece of incoming data to nodes Nb, Nc, Nd, Nf, Ng, and Nh because the piece of incoming data is not addressed to node Ne (arrows C5). In addition, node Ne receives pieces of data forwarded by nodes Nc and Nd (arrows C3 and C4). Node Ne discards the pieces of incoming data because the pieces of incoming data are not addressed to node Ne and are the same as the piece of data that has been received from node Nb previously.

Node Nf receives a piece of data relating to this communication for the first time, and the piece of data has been forwarded by node Nc (arrow C3). Node Nf forwards the piece of incoming data to nodes Nc, Ne, and Nh because the piece of incoming data is not addressed to node Nf (arrows C6). In addition, node Nf receives a piece of data forwarded by node Ne (arrow C5). Node Nf discards the piece of incoming data because the piece of incoming data is not addressed to node Nf and is the same as the piece of data that has been received from node Nc previously.

Node Ng receives a piece of data relating to this communication for the first time, and the piece of data has been forwarded by node Nd (arrow C4). Node Ng forwards the piece of incoming data to nodes Nd, Ne, and Nh because the piece of incoming data is not addressed to node Ng (arrows C7). In addition, node Ng receives a piece of data forwarded by node Ne (arrow C5). Node Ng discards the piece of incoming data because the piece of incoming data is not addressed to node Ng and is the same as the piece of data that has been received from node Nd previously.

Node Ne further receives pieces of data forwarded by nodes Nf and Ng (arrows C6 and C7). Node Ne discards the pieces of incoming data because the pieces of incoming data are not addressed to node Ne and are the same as the piece of data that has been received from node Nb previously.

Similarly, node Nf further receives a piece of data forwarded by node Ne (arrow C5). Node Nf discards the piece of incoming data because the piece of incoming data is not addressed to node Nf and is the same as the piece of data that has been received from node Nc previously.

Similarly, node Ng further receives a piece of data forwarded by node Ne (arrow C5). Node Ng discards the piece of incoming data because the piece of incoming data is not addressed to node Ng and is the same as the piece of data that has been received from node Nd previously.

Next, node Nh receives a piece of data relating to this communication for the first time, and the piece of data has been forwarded by node Ne (arrow C5). The piece of incoming data is addressed to node Nh, and thus node Nh accepts the piece of incoming data and retains the piece of incoming data in the data retaining unit 120. If processing to be performed upon receiving the data is determined, node Nh performs the processing. In addition, node Nh receives pieces of data forwarded by nodes Nf and Ng (arrows C6 and C7). Node Nh discards the pieces of incoming data because the pieces of incoming data are addressed to node Nh but are the same as the piece of data that has been received from node Ne previously.

Example Hardware Configuration

Figure 7:
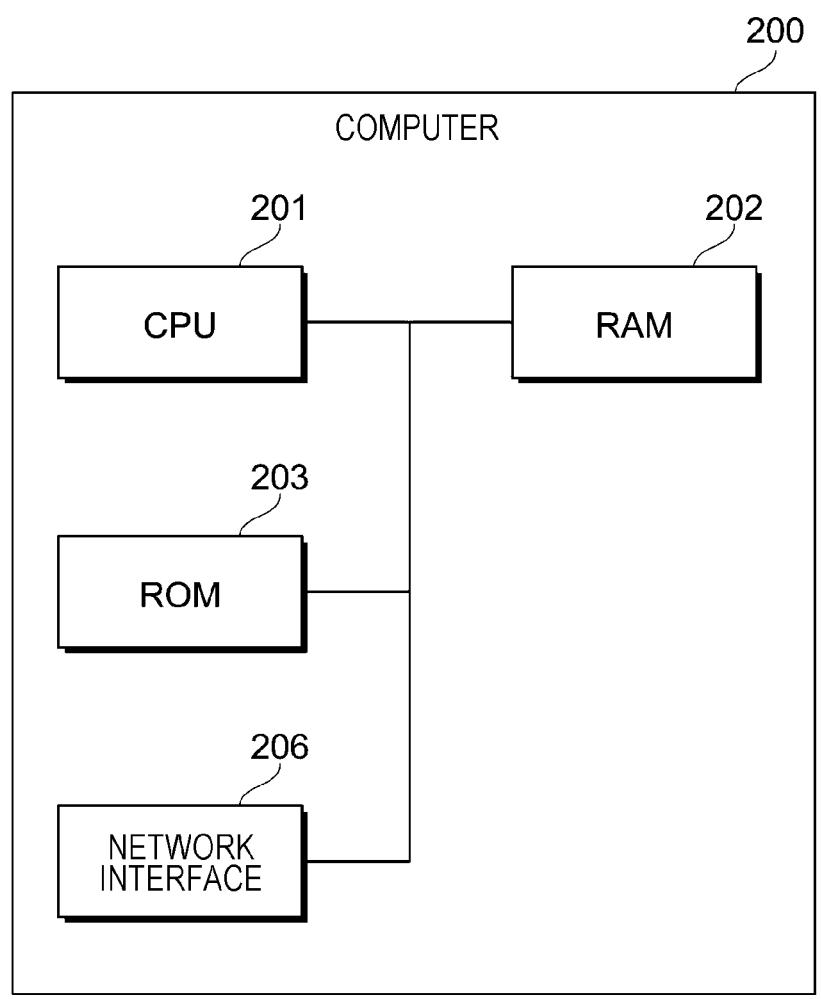
FIG. 7 depicts an example hardware configuration of a computer used as the terminal.

FIG. 7 depicts an example hardware configuration of a computer used as the terminal 100. A computer 200 depicted in FIG. 7 includes a central processing unit (CPU) 201, which is a calculating unit, and a RAM 202 and a read-only memory (ROM) 203, which are storage units. The CPU 201 reads programs stored in the ROM 203 into the RAM 202 and executes the programs. The RAM 202 is used as a working memory during processing performed by the CPU 201. The computer 200 also includes a network interface 206 to connect the computer 200 to the network 10. The hardware configuration depicted in FIG. 7 is merely an example, and the terminal hardware used in the present exemplary embodiment is not limited to the example configuration in FIG. 7. For example, an output unit having a light emitting diode (LED) or the like may be included, or an input unit having a key switch or the like may be included. Further, sensors or the like to acquire various kinds of data may be included.

When the functions of the terminal 100 depicted in FIG. 2 are realized by the hardware depicted in FIG. 7, the transceiver 110, for example, is realized by the network interface 206. The data retaining unit 120 and the relay information retaining unit 150 are realized, for example, by the RAM 202. Further, the transmission controller 130 and the incoming data processing unit 140 are realized, for example, by the CPU 201 executing the programs stored in the ROM 203.

The exemplary embodiment of the present disclosure has been described as above, but the technical scope of the present disclosure is not limited to the exemplary embodiment described above. Various modifications and alternatives to the configuration that do not depart from the technical scope of the present disclosure are included in the present disclosure. For example, in the exemplary embodiment described above, the network 10 is assumed to be a wireless mesh network, but the exemplary embodiment may be applied to wired networks or ad hoc networks at large.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A communication apparatus comprising:
   a transmitting and receiving unit that is connected to a network and that transmits and receives data;
   a relaying unit that, when data is received through a communication that is not addressed to the communication apparatus, relays the communication; and
   a discarding unit that, when data is received through the same communication as a communication that has been relayed previously, discards the data,
   wherein information to identify the source node and the information to uniquely identify the communication are extracted from the received data,
   wherein the discarding unit determines the same communication by using an information set of the information to identify the source node and the information to uniquely identify the communication.

2. The communication apparatus according to claim 1, wherein the relaying unit performs broadcast transmission to nodes on the network to relay the communication through which the data is received and that is not addressed to the communication apparatus.

3. The communication apparatus according to claim 2, wherein the transmitting and receiving unit exchanges data with nodes on the network wirelessly.

4. The communication apparatus according to claim 1, wherein, when a source node that has initiated transmission and information that uniquely specifies a communication are the same for a communication through which data is received and for a communication that has been relayed previously, the discarding unit discards the communication through which the data is received as the same communication as the communication that has been relayed previously.

5. The communication apparatus according to claim 4, further comprising:
an extracting unit that extracts information to identify the source node and information to uniquely identify the communication from received data; and
a retaining unit that retains information extracted by the extracting unit.

6. The communication apparatus according to claim 4, wherein the information to uniquely identify the communication is identifying information attached to data by the source node.

7. A network system comprising:
a plurality of nodes that constitute a network and exchange data with each other,
wherein at least one node has a function as a source node capable of initiating transmission of data to one or more other nodes being destinations, and
each node has
a function as a relaying node that, when data that is not addressed to the node is received, transmits the data to one or more other nodes, and
a function that, when data is received through the same communication as a communication through which the node has transmitted data, discards the data,
wherein information to identify the source node and the information to uniquely identify the communication are extracted from the received data,
wherein the same communication is determined by using an information set of the information to identify the source node and the information to uniquely identify the communication.

8. The network system according to claim 7, wherein the network is a mesh network.

9. The network system according to claim 8, wherein the node performs broadcast transmission to each node on the network to transmit the data.

10. The network system according to claim 7, wherein the node extracts and retains, upon relaying received data, information to identify the source node that has transmitted the received data and information to uniquely identify a communication through which the received data has been transmitted and,
discards the received data when the same information set as an information set of the information to identify the source node and the information to uniquely identify the communication, the information set having been extracted from the received data, is already retained.

11. The network system according to claim 10, wherein, upon transmitting data, the source node attaches to the data information to identify the source node and information to uniquely identify a communication through which the data is transmitted and transmits the data.

12. A non-transitory computer readable medium storing a program causing a computer that controls a communication apparatus to execute a process for information processing, the process comprising:
when data is received through a communication that is not addressed to the communication apparatus, relaying the communication; and
when data is received through the same communication as a communication that has been relayed previously, discarding the data,
wherein information to identify the source node and the information to uniquely identify the communication are extracted from the received data,
wherein when determining the same communication, an information set of the information to identify the source node and the information to uniquely identify the communication is used.

* * * * *